United States Patent [19]
Pywell et al.

[11] Patent Number: 5,492,368
[45] Date of Patent: Feb. 20, 1996

[54] ROLLOVER SEAT SYSTEM

[75] Inventors: James F. Pywell, Shelby Township; Harold J. Miller, Troy, both of Mich.

[73] Assignee: General Motors Corporation, Detroit, Mich.

[21] Appl. No.: 447,298

[22] Filed: May 22, 1995

Related U.S. Application Data

[63] Continuation of Ser. No. 394,319, Feb. 23, 1995, abandoned.

[51] Int. Cl.$^6$ .................................................. B60R 22/36
[52] U.S. Cl. ............................................ 280/806; 280/807
[58] Field of Search .............................. 180/268; 280/806, 280/807

[56] References Cited

U.S. PATENT DOCUMENTS

| | | | |
|---|---|---|---|
| 3,981,518 | 9/1976 | Pulling | 280/730 |
| 4,154,472 | 5/1979 | Bryll | 296/65.1 |
| 4,257,626 | 3/1981 | Adomeit | 280/806 |
| 4,738,485 | 4/1988 | Rumpf | 297/216 |
| 4,772,046 | 9/1988 | Salomonsson et al. | 280/806 |
| 4,917,210 | 4/1990 | Danicek et al. | 180/268 |
| 4,958,854 | 9/1990 | Haland | 280/806 |
| 4,999,004 | 3/1991 | Skanberg et al. | 297/480 |
| 5,125,472 | 6/1992 | Hara | 180/271 |
| 5,149,165 | 9/1992 | Woolley | 296/68.1 |
| 5,186,494 | 2/1993 | Shimose | 280/806 |
| 5,211,423 | 5/1993 | Krambeck | 280/806 |
| 5,288,105 | 2/1994 | Ikegaya et al. | 280/806 |
| 5,290,062 | 3/1994 | Fohl | 280/801.1 |

FOREIGN PATENT DOCUMENTS

| | | |
|---|---|---|
| 89771/91 | 12/1991 | Australia . |
| 0552668A1 | 7/1993 | European Pat. Off. . |
| 0552669A1 | 7/1993 | European Pat. Off. . |
| 3631881C2 | 4/1990 | Germany . |
| 4304492A1 | 8/1993 | Germany . |
| 4305848A1 | 9/1993 | Germany . |
| 4217969A1 | 12/1993 | Germany . |
| 4305596A1 | 2/1994 | Germany . |
| 4227822A1 | 2/1994 | Germany . |
| 4227780A1 | 2/1994 | Germany . |
| 4228146A1 | 3/1994 | Germany . |
| 1770176A1 | 10/1992 | U.S.S.R. . |

OTHER PUBLICATIONS

Digges et al, "Opportunities for Casualty Reduction in Rollover Crashes", Prevention Through Biomechanics Symposium Proceedings, Centers for Disease Control, May 5–6, 1994. pp. 161–171.

Nilson et al, "Methods of Reducing Injuries in Roll–Over Accidents", MADYMO Users' Meeting, 1993.

*Primary Examiner*—Kenneth R. Rice
*Attorney, Agent, or Firm*—Ernest E. Helms

[57] ABSTRACT

A vehicle seat system for a vehicle seat mounted on the vehicle floor is provided including a resilient vehicle seat bun for normally supporting a seated occupant at a given height above the vehicle floor; a lap restraint to cross over the seated occupant to restrain the occupant in the vehicle seat; a belt wrench tensionally associated with the lap restraint to tension the lap restraint to an extent to significantly pull down toward the vehicle floor the seated occupant into the seat bun such that the seated occupant's head is brought closer to the floor; and a sensor to activate the belt wrench when the vehicle undergoes a displacement condition indicative of a vehicle rollover condition.

16 Claims, 3 Drawing Sheets

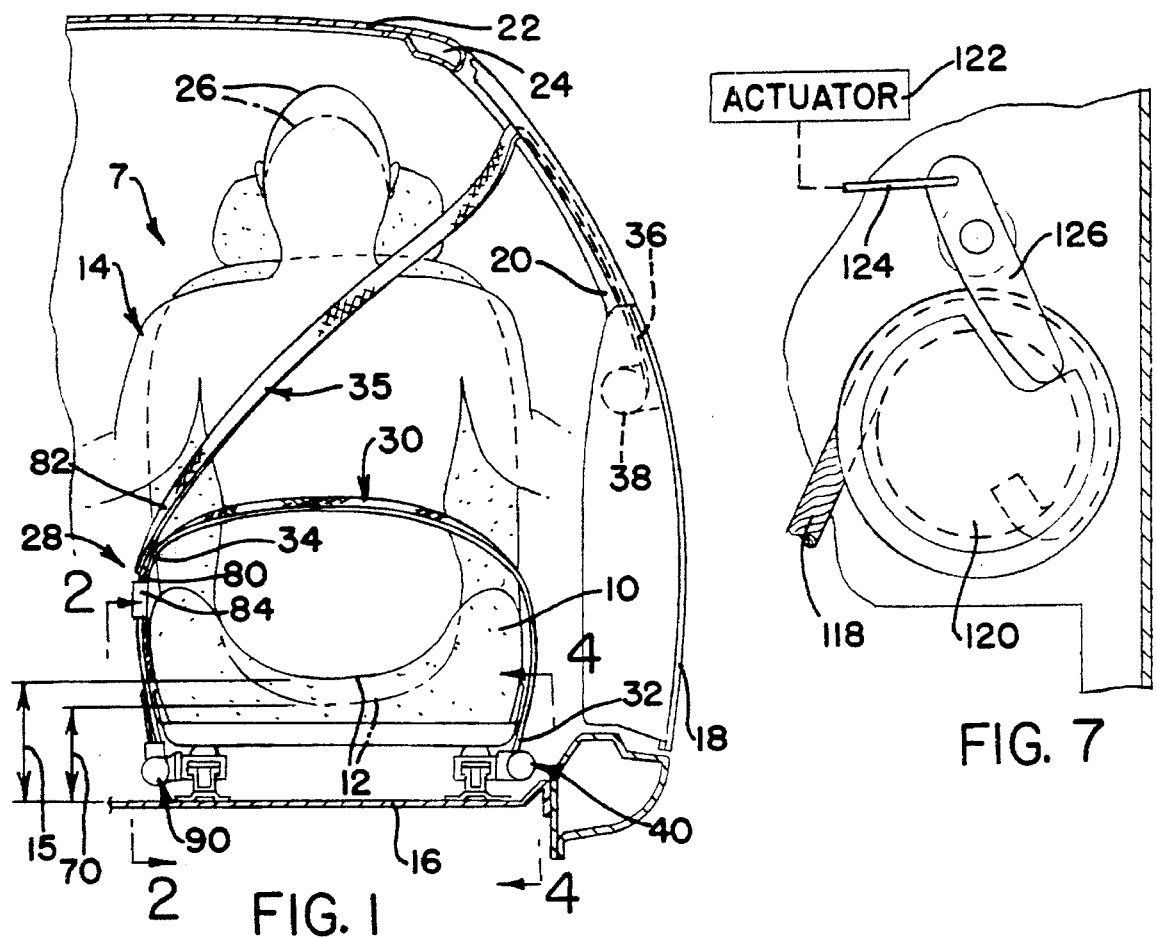
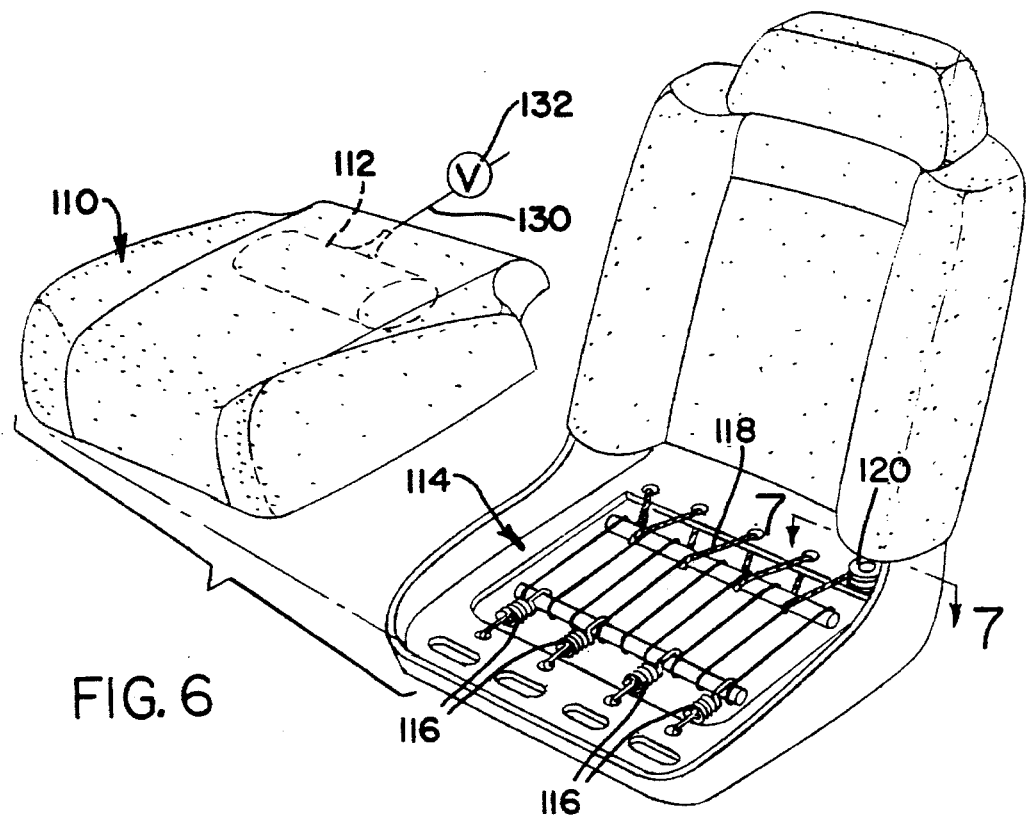

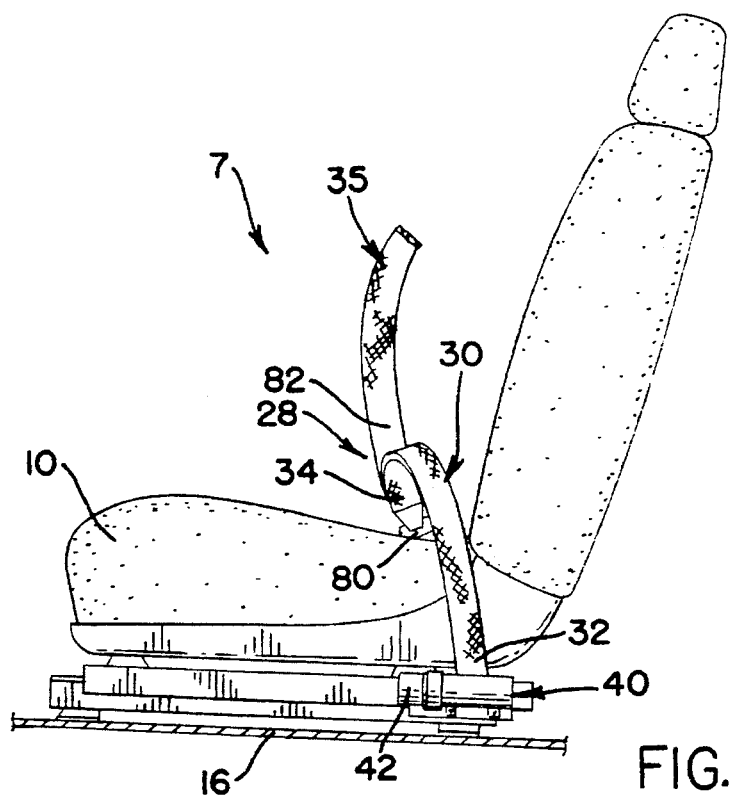
FIG. 4
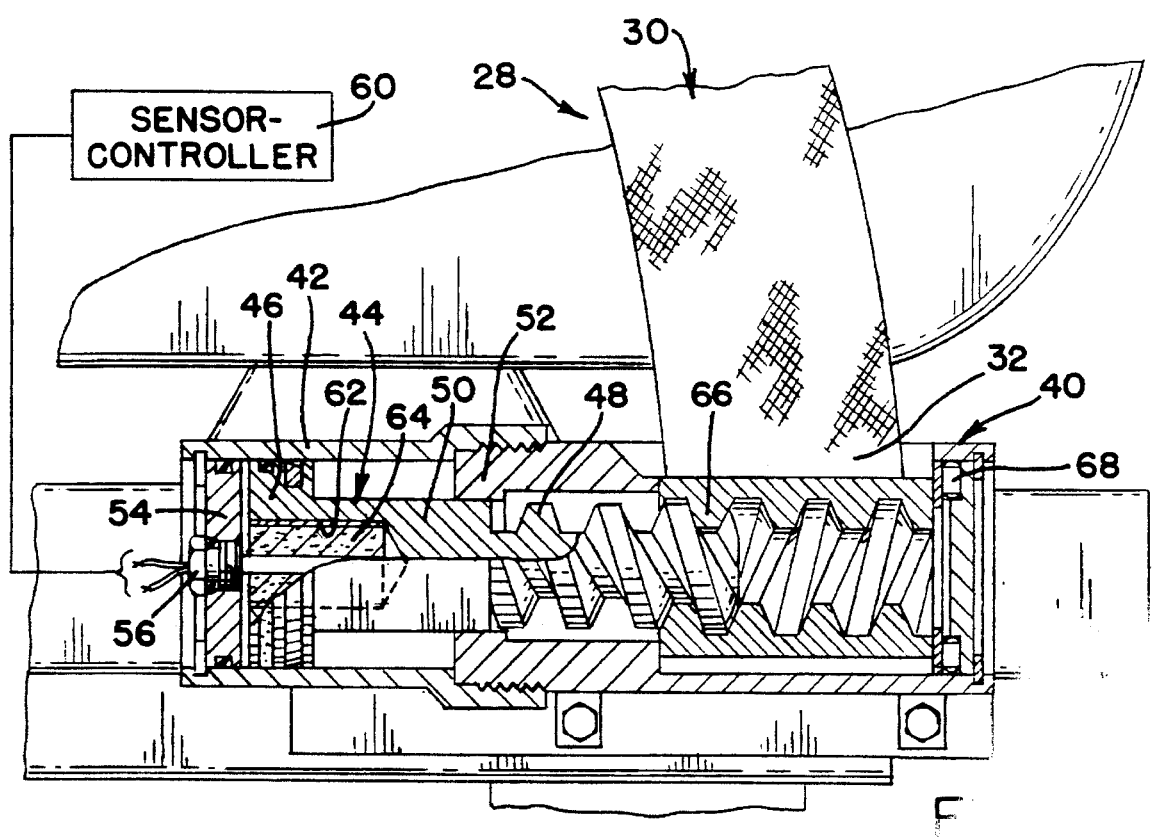

5,492,368

ROLLOVER SEAT SYSTEM

This is a continuation of U.S. Ser. No. 08/394,319 filed on Feb. 23, 1995, now abandoned.

FIELD OF THE INVENTION

The field of the present invention is that of belt restraint seat systems for seated occupants in automotive vehicles and methods of utilization thereof.

BACKGROUND OF THE INVENTION

Most belt restraint seat systems are designed mainly to minimize injuries resulting from frontal, side or rear impacts.

SUMMARY OF THE INVENTION

The present invention brings forth a restraint seat system which attempts to minimize injuries resultant from rollover accidents beyond that offered by present belt restraint systems.

BRIEF DESCRIPTION OF THE DRAWINGS

FIG. 1 is a front elevational view with portions of the vehicle in section exposing a vehicle floor, door section and roof as well as a B-pillar and a vehicle seat restraint system according to the present invention which is inclusive of a lap and shoulder restraint belt wrench pretensioner and seat belt retractor.

FIG. 4 is a view taken along line 4—4 of FIG. 1.

FIG. 5 is an enlarged view partially sectioned of a portion shown in FIG. 4.

FIG. 6 is an exploded view of an alternate preferred embodiment of the present invention.

FIG. 7 is a view taken along line 7—7 of FIG. 6.

DESCRIPTION OF THE PREFERRED EMBODIMENT

Figure 2:
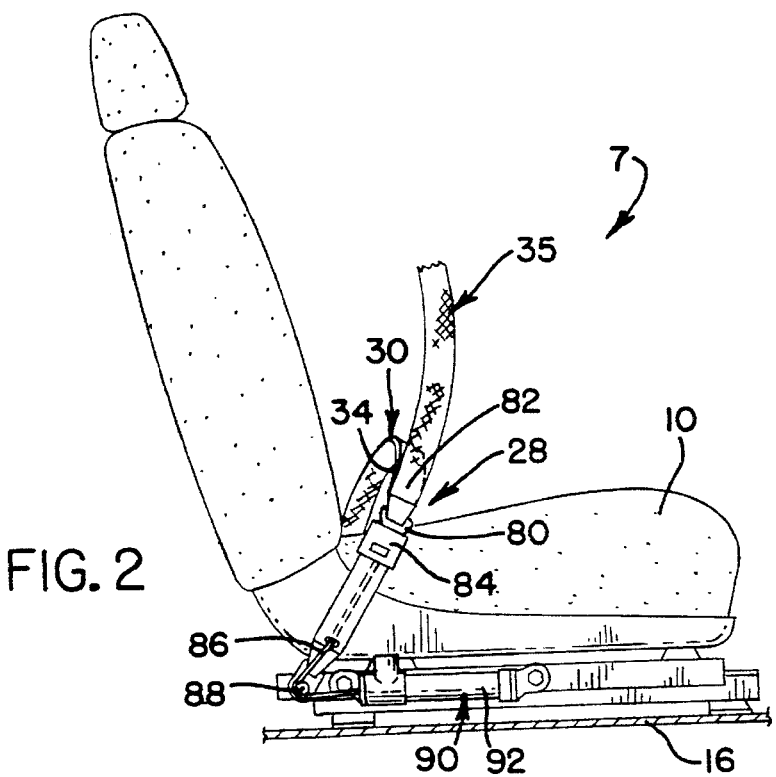
FIG. 2 is a view taken along line 2—2 of FIG. 1.

Referring to FIGS. 1 through 7, a vehicle seat system 7 according to the present invention has a resilient seat bun or cushion 10 which normally supports the buttocks and thigh region 12 of a vehicle seat occupant 14 at a given height 15 above the vehicle floor 16.

Joined to the vehicle floor 16 is a door section 18, a B-pillar 20 and a roof 22 along with a side roof reinforcement frame 24. Prior studies have indicated that many head and neck region injuries suffered by vehicle seat occupants in rollover conditions occur from contact of the head and neck region 26 of the vehicle occupant with the roof 22 or roof frame reinforcement 24. Such injuries occur even when the structural integrity of the roof 22 and roof reinforcement 24 are almost totally maintained or with the addition of roll bar structures. Therefore, to additionally minimize injuries to region 26 of a seated occupant, structural integrity of the roof and roof reinforcement 24 must be supplemented by additional measures. Reliance upon structural integrity of the roof and roof reinforcement 24 does not guarantee elimination of injuries to the head and neck region 26.

A belt restraint 28 has a lap portion 30 having a first end 32 and a second end 34. Integrally continuous with the lap belt 30 is a shoulder restraint belt 35 having a first end 82 and a second end 36. In another embodiment (not shown), the belt and shoulder restraints will terminate. The shoulder restraint 35 passes through a loop (not shown) positioned on the B-pillar 20 and is then connected to a web grabbing-type belt retractor 38 which automatically by inertia and/or activation by a signal locks the second end 36 of the belt in an accident condition.

Tensionally associated with the first end 32 of a lap restraint portion of the belt is a pyrotechnic rotary belt wrench 40. The belt wrench 40 has a cylindrical housing 42 which sealably mounts a piston screw 44. Piston screw 44 has a head portion 46 joined to a screw portion 48. The piston portion 46 has a shank 50 which passes through a geometrically matching noncircular sleeve 52 to prevent the piston 44 from rotating. The rotary wrench at one end has a sealed end plate 54 which mounts a fuse 56 which is electrically connected to a sensor controller 60. The sensor controller 60 senses a displacement of the vehicle floor 16 indicative of a rollover condition and sends a signal to the fuse 56 in response thereto. The variable of displacement sensed can be lateral acceleration or rotational velocity of the vehicle or derivatives or integrals thereof.

The piston 44 also has an inner cavity 62 which mounts an explosive charge 64. Partially threadably penetrated by the screw portion 48 of the piston is a drum reel 66. The drum reel 66 is rotatably mounted by a rotor thrust bearing 68.

When the rotary wrench 40 is actuated, the fuse 56 lights the charge 64, causing the piston 44 to move rightward (as shown in FIG. 5), causing the rotary wheel 66 to rotate to pull the first end 32 of the lap belt with a tunable force typically between 500 and 1800 pounds force. The rotary action of the drum reel 66 will cause up to a 300 mm length of the belt restraint to be pulled, causing the buttocks of the seated occupant to move downwardly to a height 70 as best shown in FIG. 1 and in a similar fashion cause a commensurate 50 mm to 120 mm displacement of the head region of the vehicle seat occupant, causing the buttocks and head region of the seated occupant to come closer to the vehicle floor 16. Thus, in a rollover condition, the head of the vehicle seat occupant is further removed from the roof 22 or roof reinforcement 24, thereby minimizing the chance of injury.

Pressure in the rotary belt wrench 40 from the expanded gas keeps the belt wrench 40 from unreeling (typically in the neighborhood of a few minutes) until the rollover event stops. If necessary, a locking ratchet (not shown) can be added to the belt wrench to prevent retraction.

Experimental data has indicated typically the maximum rotational velocity of a vehicle in a rollover situation is in the neighborhood of 0.8 to 1 revolution per second. Therefore, the sensor need not signal the belt wrench 40 to actuate until 200 milliseconds into a rollover occurrence. The time of operation of the belt wrench 40 is approximately 250 to 300 milliseconds.

Figure 3:
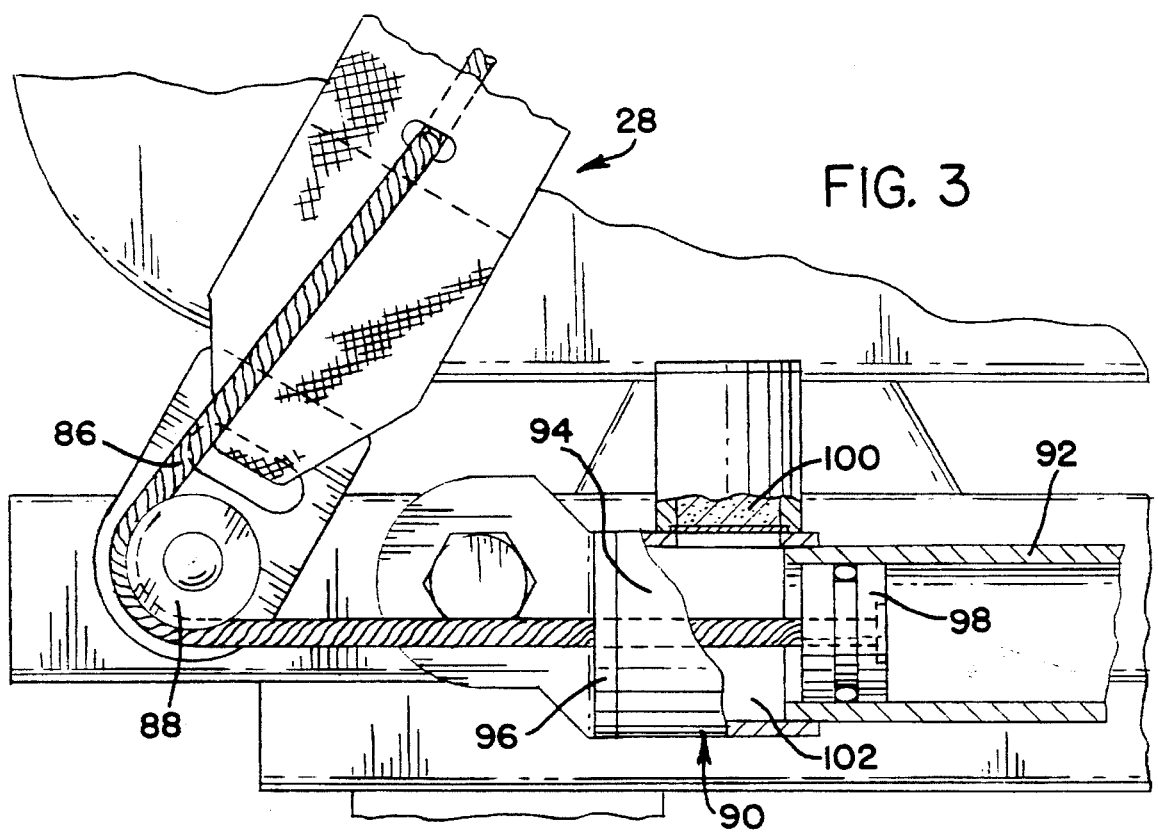
FIG. 3 is an enlargement of a portion of FIG. 2 with portions sectioned for clarity of illustration.

Referring in particular to FIGS. 1, 2 and 3, the second end 34 of the lap restraint 30 hooks through a loop 80 to integrally connect to a first end 82 of the shoulder restraint 35. (In another embodiment not shown, the lap restraint and the shoulder restraint terminate with the loop 80.) The loop 80 latches into a seat belt buckle 84 which is connected to a pretensioner cable 86. The pretensioner cable 86 loops around a pulley wheel 88 to where it is connected to a pyrotechnic pretensioner 90. The pyrotechnic pretensioner 90 can be a spring loaded or as shown pyrotechnic type and has a cylindrical body 92 capped at one end by a explosive chamber 94 which has a small hole for entry of a cable 86 at its left end wall 96. The cable is connected to a piston 98 which is slidably sealably mounted within the cylindrical portion 92. The piston 98 typically has some kind of clutch mechanism (not shown) preventing it from being backdriven once it is pushed rightwardly (as shown in FIGS. 2 and 3). Observation by the sensor 60 of a rollover condition will cause an electronic signal (simultaneous with the signal to the belt wrench 40) to be sent to the pretensioner 90, causing a pyrotechnic charge 100 to be ignited, pressurizing an expansion chamber 102 and thereby moving the piston 98 rightwardly. This will cause a rapid (in the neighborhood of 10 milliseconds) pull on the cable 86 which will take up any slack in the belt restraint 28 from the retractor 38 all the way to the rotary pyrotechnic wrench 40 by pulling down on the latch 84.

The rapid action of the pretensioner 90 minimizes the amount of belt that must be wrapped around the rotary wheel 66 of the belt wrench before a force increases on the lap of occupant 14 to the extent where it pulls the seated occupant 14 down into the seat bun 10.

From the activation of the pretensioner 90 and the belt wrench 40, approximately 10 milliseconds, the retractor 38 will lock and only one-half revolution of belt will be pulled from it before the belt will be taut. The retractor 38 receives a signal at the same time as the belt wrench 40.

Referring to FIGS. 6 and 7, the present inventive seat system is augmented by additionally having a dual methodology collapsible seat cushion bun 110. Seat cushion bun 110 has a fluid filled bladder 112 which may be pneumatically filled or hydraulically filled which is releasably valved by valve 132 via line 130 to evacuate after receiving a signal of an impending rollover condition. The above allows the seat occupant 14 to be drawn down further and therefore brings the head region 26 further away from the roof and reinforcement structure. The seat cushion 110 also has a collapsible suspension 114 which is tightened on one end by a group of springs 116 and on the other end by a flexible tension member 118 which is then anchored to a roller 120. Upon being signalled of an impending rollover condition, an actuator 122 pulls on a rod 124, pivoting lever 126 to a release position allowing the roller 120 to freely rotate in an unwinding fashion, thereby collapsing seat suspension to allow the seat occupant to be brought down further into the seat.

In still another embodiment not shown, the seat suspension and/or bladder can be released (failed) by use of a rapid deflagrating cord material. (Deflagrating cord is a cord material with a very rapid linear burn rate.)

While this invention has been described in terms of a preferred embodiment thereof, it will be appreciated that other forms could readily be adapted by one skilled in the art. Accordingly, the scope of this invention is to be considered limited only by the following claims.

What is claimed is:

1. A vehicle seat system for a vehicle seat mounted on a floor of a vehicle comprising:
   a resilient vehicle seat bun for normally supporting a seated occupant at a given height above the vehicle floor;
   a lap restraint to cross over the seated occupant to restrain the occupant in the vehicle seat;
   a belt wrench tensionally associated with the lap restraint to tension the lap restraint to an extent to significantly pull down toward the vehicle floor the seated occupant into the seat bun such that a head of a seated occupant is brought closer to the floor; and
   a sensor to activate the belt wrench when the vehicle undergoes a displacement condition indicative of a vehicle rollover condition.

2. A vehicle seat system as described in claim 1 wherein the belt wrench pulls with a tensional force of over 500 pounds force.

3. A vehicle seat system as described in claim 1 wherein the belt wrench is a pyrotechnically rotary powered wrench.

4. A vehicle seat system as described in claim 1 wherein there is additionally a pretensioner which tensions the lap restraint in the displacement condition indicative of a vehicle rollover condition.

5. A vehicle seat system as described in claim 4 wherein the pretensioner works substantially faster than the belt wrench.

6. A vehicle seat system as described in claim 1 wherein the lap restraint is also operatively associated with a shoulder harness.

7. A vehicle seat system as described in claim 6 wherein an end of the shoulder harness generally opposite the lap restraint is connected to a signalled retractor.

8. A vehicle seat system as described in claim 6 wherein an end of the lap restraint opposite the belt wrench is connected to a pretensioner.

9. A vehicle seat system as described in claim 1 wherein the seat bun is collapsible.

10. A vehicle seat system as described in claim 9 wherein the seat bun has a fluid cushion which is valved to a releasing position upon activation by the sensor.

11. A vehicle seat system as described in claim 9 wherein the seat bun has a mechanical suspension which is released upon activation by the sensor.

12. A vehicle seat system for a vehicle seat mounted on a vehicle floor comprising:
    a resilient vehicle seat bun for normally supporting a seated occupant at a given height above the vehicle floor;
    a lap restraint with first and second ends to cross over the seated occupant combined with a shoulder restraint with first and second ends to restrain the occupant in the vehicle seat;
    a pyrotechnic rotary belt wrench tensionally associated with the first end of the belt restraint to tension the lap restraint to an extent of at least 500 pounds force to significantly pull down toward the vehicle floor the seated occupant into the seat bun such that a head region of a seated occupant is brought closer to the vehicle floor;
    a pretensioner tensionally associated with the second end of the lap restraint to tension the lap restraint and shoulder harness first end working significantly faster to tension the lap restraint and shoulder harness before a completion of the tensioning of the lap restraint by the belt wrench;
    a signalled belt retractor providing an anchor for the second end of the shoulder restraint; and
    a sensor to activate the belt wrench and the pretensioner when the vehicle floor undergoes a displacement condition indicative of a vehicle rollover condition.

13. A method of confining a seated vehicle occupant in a vehicle in an attempt to minimize injuries in a rollover condition comprising:

normally supporting the seated occupant on a resilient vehicle seat bun at a given height above a floor of the vehicle;

restraining in the vehicle seat the seated occupant by a belt restraint which crosses over the seated occupant's lap;

tensioning the belt restraint with a belt wrench tensionally associated with the belt restraint to an extent to significantly pull down toward the vehicle floor the vehicle occupant into the seat bun such that a head region of the seated occupant is brought closer to the vehicle floor; and sensing a displacement of the vehicle floor indicative of a vehicle rollover condition and thereafter signalling the belt wrench to tension the belt restraint.

14. A method as described in claim 13 wherein the belt wrench pulls with at least 500 pounds force.

15. A method as described in claim 13 further including pretensioning the belt restraint.

16. A method as described in claim 13 further including collapsing the seat bun in response to the rollover condition.

* * * * *